Nov. 23, 1954  F. A. RUSSELL  2,695,126
ICE-CREAM SANDWICH PACKAGE
Filed Oct. 14, 1953  3 Sheets-Sheet 1
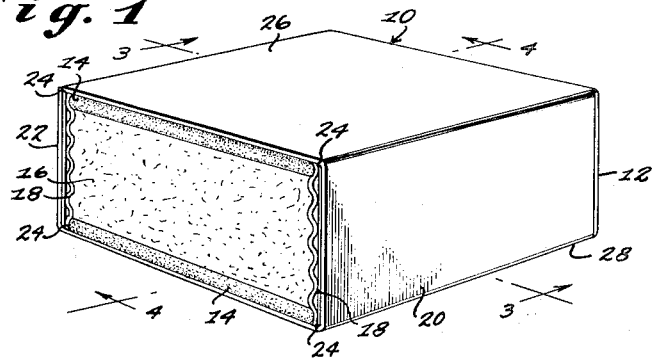
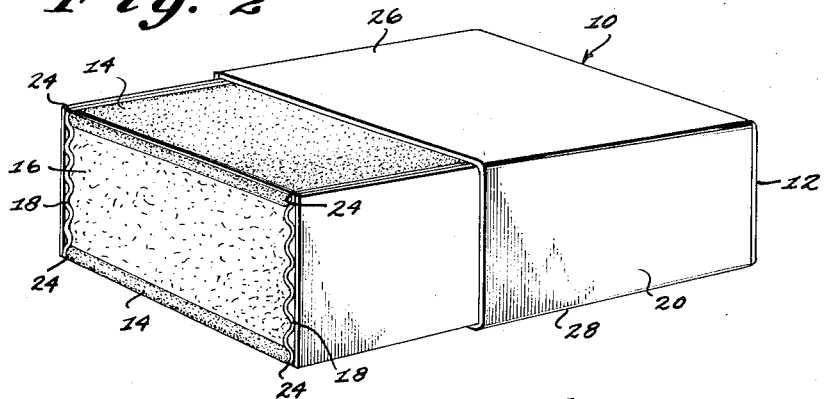
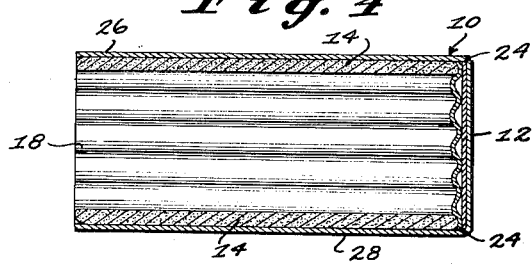
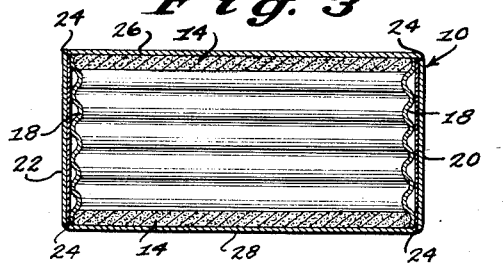
INVENTOR.
FLOYD A. RUSSELL
BY
Parrott & Richards
ATTORNEYS

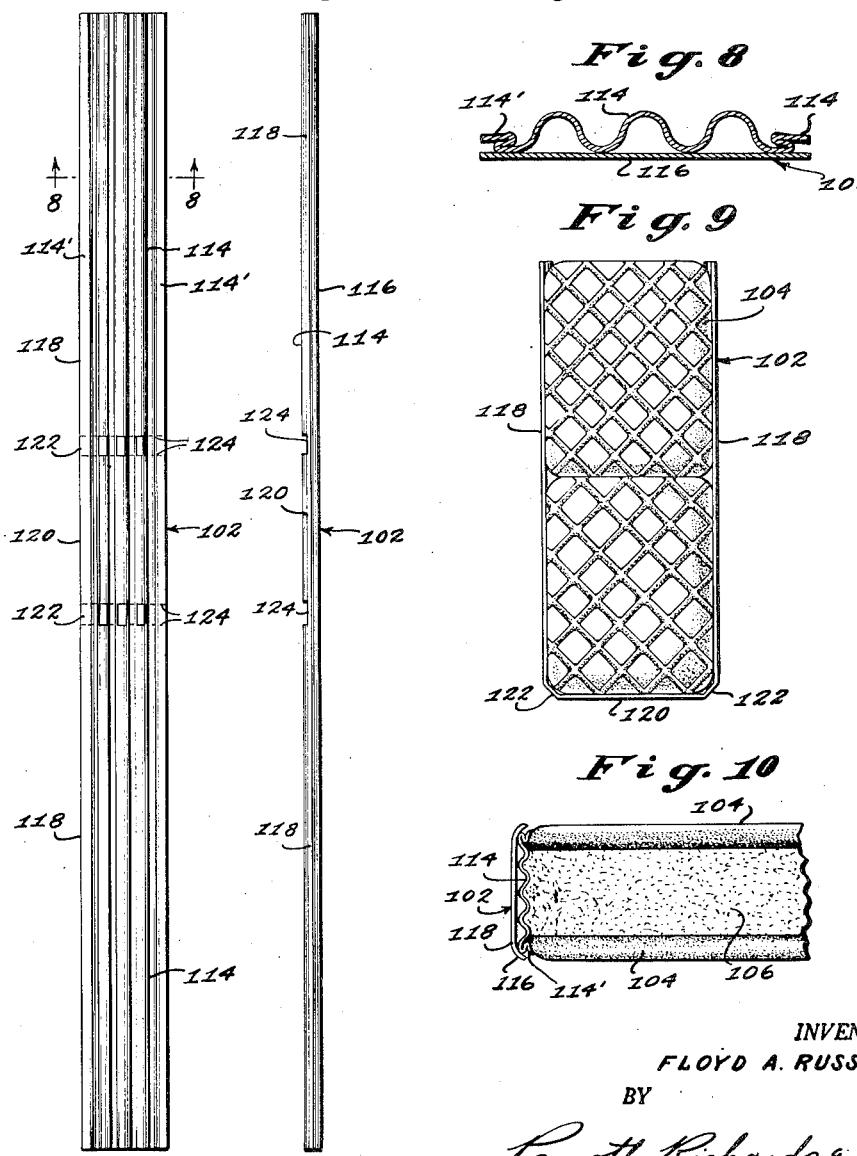

Nov. 23, 1954 F. A. RUSSELL 2,695,126
ICE-CREAM SANDWICH PACKAGE
Filed Oct. 14, 1953 3 Sheets—Sheet 3

INVENTOR.
FLOYD A. RUSSELL
BY
Parrott, Richards & Sims
ATTORNEYS

United States Patent Office 2,695,126
Patented Nov. 23, 1954

2,695,126

ICE-CREAM SANDWICH PACKAGE

Floyd A. Russell, Charlotte, N. C., assignor to Russell Corporation, a corporation of North Carolina Application October 14, 1953, Serial No. 386,084

7 Claims. (Cl. 229—14)

This invention relates to an improved arrangement for packaging ice cream sandwiches in a particularly advantageous form for merchandising, and which further allows easy and convenient removal of the ice cream sandwich from the package when it is to be eaten. This is a continuation-in-part of copending application Serial No. 163,144, filed May 20, 1950.

Ice cream sandwiches are commonly formed by pouring an ice cream filling between sandwich wafers disposed in spaced relation in a mold for the sandwich, and it has heretofore been proposed to use a box structure for the mold that was suitably arranged for serving also as a merchandising package for the completed ice cream sandwich. It has been found, however, that troublesome difficulties are encountered with a package arrangement of this sort in preventing leakage of the ice cream filling from the box structure used, and more importantly, in providing an effective means for allowing the ice cream sandwich to be removed readily from the package.

According to the present invention these difficulties are avoided entirely by arranging the ice cream sandwich package in a box structure that is fitted with a corrugated liner so that the terminal corrugations at each side of the liner may be employed as spacing slots for the sandwich wafers, and thereby provide with the wafers a substantially sealed mold in the box structure by which leakage of the ice cream filling is obviated. Also the corrugated liner may be formed of a suitable material, such as grease-proof parchment paper, so that the contained ice cream sandwich is maintained free of the walls of the box structure and is thereby disposed for removal easily whenever desired. In addition, the liner arrangement of the present invention is readily adapted for use with other types of packaging structures, such as bags, as well as with box structures.

The present invention is described more in detail below in connection with the accompanying drawings in which:

Fig. 1 is a perspective view of a complete ice cream sandwich package formed in accordance with the present invention;

Fig. 2 is a further perspective view corresponding generally to Fig. 1, but showing the ice cream sandwich partially removed from the package;

Fig. 3 is a sectional detail taken substantially on the line 3—3 in Fig. 1, but with the ice cream filling removed;

Fig. 4 is a further sectional detail taken substantially on the line 4—4 in Fig. 1, with the ice cream filling removed;

Fig. 5 is a perspective view of a modified embodiment of the present invention in which the outer packaging structure for the ice cream sandwich is shown formed by a bag and the liner arrangement is further improved;

Fig. 6 is a plan view showing the corrugated face of the liner employed in the embodiment of Fig. 5;

Fig. 7 is a right side elevation corresponding to Fig. 6;

Fig. 8 is an enlarged sectional detail taken substantially on the line 8—8 in Fig. 6;

Fig. 9 is a side elevation showing the liner of Figs. 6, 7 and 8 assembled with ice cream sandwich wafers;

Fig. 10 is an enlarged fragmentary plan view corresponding to Fig. 9 with an ice cream filling shown between the wafers;

Figure 11:
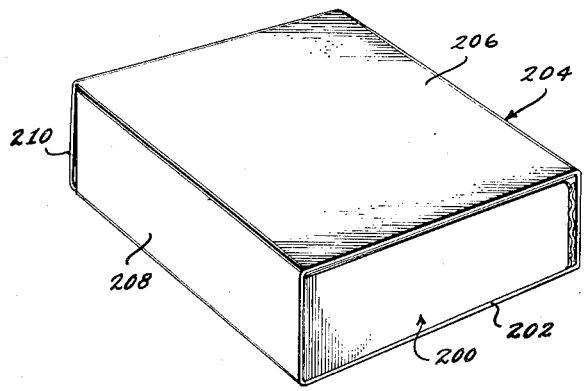
Fig. 11 is a perspective view of a further modified embodiment of the present invention in which the liner includes a top cover portion.

Referring now in detail to the drawings, the ice cream sandwich package of the present invention, as shown in the embodiment of Figs. 1 to 4, comprises a box structure 10 open at one end (i. e., the top), the closed end (or bottom) wall of the box structure being formed by any usual type of flap arrangement as at 12. The ice cream sandwich contained in the box structure 10 comprises sandwich wafers as at 14 and an ice cream filling between the wafers 14 as at 16; and, as previously mentioned, a corrugated liner 18 is further arranged in the box structure 10 according to the present invention.

This corrugated liner 18 is formed so that it may be disposed in the box structure coextensively with the bottom end wall 12 and with two opposed side walls, which will normally be the narrower side walls 20 and 22. The corrugated liner 18 is also arranged in the box structure 10 so that its corrugations are disposed inwardly in the box structure 10, and are oriented longitudinally of the end wall 12 and the opposed side walls 20 and 22. In addition, the corrugated liner 18 is arranged so that the corrugations at each side edge terminate substantially centrally of their reentrant shape as at 24, so that at these side edges the adjacent convex portion of the corrugations of the liner 18 form a continuous shoulder extending as an abutment throughout the entire length of the liner 18 so as to provide guide slots for receiving and positioning the sandwich wafers 14 against the other opposed side walls 26 and 28 of the box structure 10, and thereby maintain the wafers 14 in proper spaced relation to allow the ice cream filling 16 to be poured between them in forming the ice cream sandwich.

By this arrangement the corrugated liner 18 forms with the wafers 14 a substantially sealed mold within the box structure 10 so that, when the ice cream sandwich is completed, the ice cream filling 16 is contained free of contact with the interior surfaces of the walls of the box structure 10 at any point, which means that no special precaution is necessary at the end wall 12 of the box structure 10 to try and prevent leakage of the ice cream filling 16 at this point, and further that the ice cream sandwich, being maintained entirely free of the walls of the box structure 10, will be disposed for easy removal as illustrated in Fig. 2 when it is to be eaten.

Figs. 5 to 10 of the drawings illustrate a modified embodiment of the present invention in which the outer packaging structure is shown formed by a bag 100, and which incorporates a further improved liner 102 for arranging sandwich wafers 104 and an ice cream filling 106 therebetween within the bag 100, as shown in Fig. 5.

The bag 100 is illustrated in Fig. 5 to indicate particularly the advantageous use of the liner 102 therewith, but is otherwise only representative of any similar or comparable unitary, collapsible, outer packaging structure that might be suitably or desirably selected for packaging ice cream sandwiches. For this purpose, the outer packaging structure, such as the bag 100, is characteristically open at the top and formed with opposed side walls 108 and end walls 110, and a bottom closure wall 112 therefor.

The liner 102, which is separably disposed in the outer packaging structure or bag 100 as in the previously described embodiment, is again of corrugated form, being constituted of backed corrugated sheet material as shown in Figs. 6, 7 and 8, in which the corrugated facing of the liner 102 is indicated by the reference numeral 114 and the backing therefor by the reference numeral 116. As thus constituted, the liner 102 is arranged with component opposable end wall portions 118 and an intermediate bottom wall portion 120 foldably joined in series and coextensive both longitudinally and transversely with the opposed end walls 110 and bottom closure wall 112 of the bag 100.

The foldably joined arrangement of these component liner portions 118 and 112 is such that, when the liner 102 is disposed within the bag 100, the corrugated facing 114 is positioned inwardly and the fully formed corrugations thereof extend continuously throughout the composite length of the liner portions 118 and 112 in spaced relation with respect to the longitudinal side edges of the liner 102, while a portion of a continuous mashed corrugation 114' is disposed along each of the longitudinal liner side edges.

These mashed corrugation portions 114' serve several purposes. In the first place, they greatly facilitate location of the fully formed corrugations of the facing 114 consistently in satisfactorily spaced relation with respect to the longitudinal side edges of liner 102. This is so because, as a practical matter, the transverse spacing or distance between corrugations in ordinary corrugated sheet material commonly varies both between successive corrugations of a given sheet and between different batches of sheet material. As a result, in attempting to form a liner according to the present invention in a given width, the normally encountered variations in corrugation spacing make it impossible to cut the liners so that their longitudinal side edges fall consistently at substantially the center of the reentrant shape of the corrugations, and a higher than desirable proportion of faulty liners are consequently formed. However, if the facing 114 of the corrugated sheet material is selected so that the liner width is a multiple of the corrugation spacing, and each corrugation located at this multiple is first mashed flat against the backing 116 before the liner 102 is cut, the variation in corrugation spacing is lost in the mashed corrugation so that usable liners 102 are regularly produced.

The resulting mashed corrugation portions 114' also have the effect of disposing edges of the corrugated facing 114 free of the edges of the backing 116 at the longitudinal side edges of the liner 102, as seen best in Figs. 8 and 10, and which effect provides uniquely for fitting the liner 102 closely around the corners of the sandwich wafers 104. It has been previously noted that the liner 102 is formed with component end wall and bottom portions 118 and 120 which are foldably joined in series. The purpose of this foldably joined arrangement is to provide for fitting the liner 102 to the wafers 104 for disposition in the bag 100, and the component liner portions 118 and 120 are foldably joined according to the presently described embodiment of this invention by means of hinge portions 122 defined by spaced transverse score lines 124 impressed in the liner 102.

The effect of these spaced score lines 124 is to cause the backing 116 to assume a generally angled disposition at the hinge portions 122 (as seen in Fig. 9) when the liner side portions 118 are disposed at right angles to the bottom portion 120, while the free edges of the mashed corrugation 114', on the other hand, are loose to follow the rounded form at the corners of the wafers 104 and thereby fit these corners closely for sealing the ice cream filling 106 therebetween. It should also be noted that the free edges of the corrugated facing 114 and backing 116 have a tendency to bend transversely inward in this embodiment, as illustrated in Fig. 10, and thereby further improve the fitted relation of the liner 102 with the wafers 104.

Figure 12:
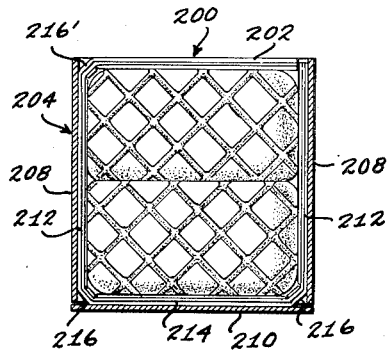
Fig. 12 is a side elevation of the embodiment shown in Fig. 11 with the outer packaging structure sectioned to show the disposition of the liner therein.
Figure 13:
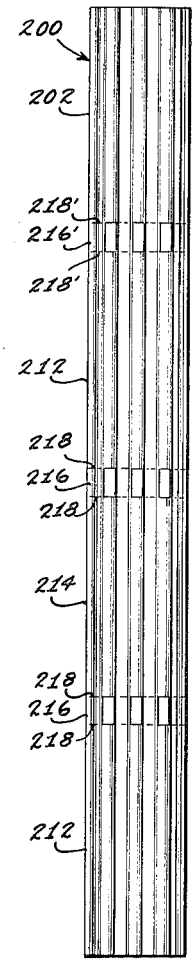
Fig. 13 is a plan view of the liner employed in the embodiment illustrated by Figs. 11 and 12.

Figs. 11 to 13 of the drawings show a still further modified embodiment of the present invention in which the liner indicated generally by the reference numeral 200 is formed with a component top cover portion 202, for use in cases where it is desired to provide protection for the exposed face of a contained ice cream filling (not shown) at the open top of an outer packaging structure 204. The outer packaging structure 204 is illustrated in this embodiment as being a box having opposed side walls 206 and end walls 208 with a bottom closure wall 210 such as was present in the first embodiment described above.

The liner 200, except for the additional top cover portion 202, is formed exactly like the liner 102 of the second embodiment just described above, having component opposable end wall portions 212 and an intermediate bottom wall portion 214 foldably joined in series at hinge portions 216 defined by spaced score lines 218. An identically arranged hinge portion 216' between score lines 218' may also be provided at the top of one of the component end wall portions 212 for also foldably joining the top cover portion 202 serially as a component of the liner 200. When disposed inside the box 204 with wafers 220, the liner 200 is fitted to the wafers 220 just as in the last described embodiment above, except that the additional top cover portion 202 is available for folding across the open top of the box 204 after an ice cream filling (not shown) has been placed therein, the corrugated form of the liner 200 causing the adjacent face of the top cover portion 202 to become imbedded in the ice cream filling and be held in place thereby.

This invention has been described in detail above for purposes of illustration only and is not intended to be limited by this description or otherwise except as defined in the appended claims.

I claim:

1. A container for an ice cream sandwich comprising an outer packaging structure having an open top, and a separable liner for said outer packaging structure, said liner being formed of backed corrugated paper sheet material and having opposite longitudinal side edges parallel to the corrugations thereof, said longitudinal side edges each being arranged intermediately of the width of a corrugation and said corrugation being mashed flat along said side edge.

2. A container for an ice cream sandwich comprising an outer packaging structure having an open top, and a separable liner for said outer packaging structure, said liner being formed of backed corrugated paper sheet material and having opposite longitudinal side edges parallel to the corrugations thereof, said longitudinal side edges each being arranged intermediately of the width of a corrugation and said corrugation being mashed flat along said side edge, said liner being further formed with component opposed end wall portions and an intermediate bottom wall portion foldably joined in series longitudinally of said corrugations, said corrugations facing inwardly and said bottom wall portion being foldably joined to each of said end wall portions each of which is at hinge portions defined by spaced score lines formed by transversely crushing the corrugations of said sheet material against the liner thereof at each score line.

3. A container for an ice cream sandwich as defined in claim 2 and further defined in that said outer packaging structure is a bag.

4. A container for an ice cream sandwich as defined in claim 2 and further defined in that said outer packaging structure is a box structure open at one end and incorporating an unsealed closure wall at the other end.

5. A container for an ice cream sandwich as defined in claim 2 and further characterized in that said liner is additionally formed with a component top cover portion foldably joined in series longitudinally of said corrugations to the top end of one of said liner end wall portions at a hinge portion defined by spaced score lines.

6. A container for an ice cream sandwich comprising a unitary, collapsible packaging structure open at the top and having opposed side walls and end walls with a bottom closure wall therefor, and a separable liner for said packaging structure, said liner being formed of backed corrugated paper sheet material and having component opposed end wall portions and an intermediate bottom wall portion foldably joined in series and coextensive both longitudinally and transversely with the opposed end walls and bottom closure wall of said packaging structure, the corrugations of said liner facing inwardly of said packaging structure and extending continuously throughout the composite length of said component liner wall portions in spaced relation with respect to the longitudinal side edges thereof, said longitudinal side edges each being arranged intermediately of the width of a corrugation and said corrugation being mashed flat along said side edge, and said component bottom wall portion being foldably joined to each of said end wall portions each of which is at hinge portions defined by spaced transverse score lines formed by transversely crushing the corrugation of said sheet material against the liner thereof at each score line.

7. A container for an ice cream sandwich comprising a unitary, collapsible, outer packaging structure open at the top and having relatively large opposed side walls and relatively small opposed end walls with an unsealed bottom closure wall therefor, and a separable liner of corrugated sheet material disposed in said packaging structure and having component opposed end wall portions and an intermediate bottom wall portion foldably joined in series and coextensive both longitudinally and transversely with the opposed end walls and bottom closure wall of said packaging structure, the corrugations of said liner facing inwardly of said packaging structure and extending continuously throughout the composite length of said liner wall portions in spaced relation with respect to the longitudinal side edges thereof, the adjacent convex portion of said corrugations at each longitudinal side edge forming a continuous shoulder extending along the component opposed end walls and bottom wall portions of said liner and providing an abutment against which sandwich wafers may be disposed in said packaging structure so that the wafers are held against the opposed side walls of said packaging structure and form a seal against leakage of ice cream filling between wafers and liner.

References Cited in the file of this patent

UNITED STATES PATENTS

| Number | Name | Date |
|---|---|---|
| 484,627 | Chapin | Oct. 18, 1892 |
| 1,121,232 | Davis | Dec' 15, 1914 |
| 1,379,100 | Haynes | May 24, 1921 |
| 2,027,791 | Schrager | Jan. 14, 1936 |
| 2,176,284 | Whiteford | Oct. 17, 1939 |
| 2,255,492 | Peters | Sept. 9, 1941 |
| 2,517,756 | Zabriskie | Aug. 8, 1950 |
| 2,521,403 | Overland | Sept. 5, 1950 |
| 2,624,989 | White | Jan. 13, 1953 |

FOREIGN PATENTS

| Number | Country | Date |
|---|---|---|
| 2779/31 | Australia | June 26, 1931 |
| 368,462 | Great Britain | Mar. 10, 1932 |